(12) United States Patent
Burns et al.

(10) Patent No.: US 9,873,306 B2
(45) Date of Patent: Jan. 23, 2018

(54) HVAC MODULE WITH HINGED CLAMP

(71) Applicant: MAHLE International GmbH, Stuttgart (DE)

(72) Inventors: Ronald T. Burns, Burt, NY (US); Steven R. Fraser, Buffalo, NY (US); David M. Chatt, Lockport, NY (US)

(73) Assignee: MAHLE International GmbH, Stuttgart (DE)

( * ) Notice: Subject to any disclaimer, the term of this patent is extended or adjusted under 35 U.S.C. 154(b) by 184 days.

(21) Appl. No.: 14/543,072

(22) Filed: Nov. 17, 2014

(65) Prior Publication Data

US 2016/0137026 A1    May 19, 2016

(51) Int. Cl.
| A47B 47/00 | (2006.01) |
| B60H 1/00 | (2006.01) |
| E05D 1/02 | (2006.01) |
| E05D 7/12 | (2006.01) |
| F16B 5/00 | (2006.01) |

(52) U.S. Cl.
CPC ..... *B60H 1/00514* (2013.01); *B60H 1/00207* (2013.01); *B60H 1/00528* (2013.01); *E05D 1/02* (2013.01); *E05D 7/121* (2013.01); *F16B 5/0012* (2013.01); *F16B 5/0016* (2013.01)

(58) Field of Classification Search
CPC ............ B60H 1/00514; B60H 1/00207; B60H 1/00528; E05D 1/02; E05D 7/121; F24F 13/20; F16B 5/0012; F16B 2/065; A47B 47/0075; E05C 19/06; E05C 3/048; E05C 5/04

USPC .................. 220/253, 309.1–318.1, 315, 319, 220/322–328, 810, 833–844; 403/335
See application file for complete search history.

(56) References Cited

U.S. PATENT DOCUMENTS

| 2,825,010 A | * | 2/1958 | Silverschotz | ........ H05K 1/0215 |
| | | | | 361/760 |
| 3,288,506 A | * | 11/1966 | Cline | ...................... F24F 13/20 |
| | | | | 24/561 |
| 3,729,780 A | * | 5/1973 | White | ..................... A44B 99/00 |
| | | | | 24/543 |
| 4,378,742 A | * | 4/1983 | Saylor | .................... B65D 90/10 |
| | | | | 105/377.08 |
| 4,708,895 A | * | 11/1987 | Mizusawa | ............... F16B 5/126 |
| | | | | 24/289 |

(Continued)

FOREIGN PATENT DOCUMENTS

| DE | 19923641 A1 | 11/2000 |
| JP | H1071826 A | 3/1998 |

(Continued)

*Primary Examiner* — Daniel J Troy
*Assistant Examiner* — Timothy M Ayres
(74) *Attorney, Agent, or Firm* — Brinks Gilson & Lione

(57) ABSTRACT

A heating, ventilation, and air-conditioning (HVAC) module for a vehicle includes a base, a cover, and a clamp. The base is configured to define a post protruding from a wall of the base. The cover is configured to define a hole that cooperates with the post to couple the cover to the base to form a housing of the module. The base is further configured to define the clamp which is coupled to the wall by a hinge. The clamp is operable between an open position where the hole can be placed around the post and a closed position where the clamp retains the hole around the post.

7 Claims, 3 Drawing Sheets

(56) References Cited

U.S. PATENT DOCUMENTS

| | | | | |
|---|---|---|---|---|
| 4,983,047 A * | 1/1991 | Netto | ............... | B65D 27/30 |
| | | | | 24/30.5 R |
| 5,103,538 A * | 4/1992 | Ryder | ............... | A44B 17/0023 |
| | | | | 24/453 |
| 5,250,752 A * | 10/1993 | Cutright | ............... | H05K 9/0062 |
| | | | | 174/363 |
| 5,657,892 A * | 8/1997 | Bolli | ............... | B65D 90/10 |
| | | | | 220/325 |
| 5,671,513 A * | 9/1997 | Kawahara | ............... | F16B 21/075 |
| | | | | 24/581.11 |
| 5,709,601 A | 1/1998 | Heck | | |
| 6,030,063 A * | 2/2000 | Benner | ............... | H02B 1/30 |
| | | | | 211/189 |
| 6,045,444 A | 4/2000 | Zima et al. | | |
| 6,385,036 B1 * | 5/2002 | Chien | ............... | G06F 1/181 |
| | | | | 312/215 |
| 6,622,873 B2 * | 9/2003 | Hegrenes | ............... | H05K 7/183 |
| | | | | 211/187 |
| 7,731,261 B2 | 6/2010 | Wenzel et al. | | |
| 7,762,411 B2 * | 7/2010 | Hilburn | ............... | H05K 7/1489 |
| | | | | 211/192 |
| 8,209,789 B2 * | 7/2012 | Greenspon | ............... | A47K 13/26 |
| | | | | 4/234 |
| 9,061,566 B2 * | 6/2015 | Hoehn | ............... | F16B 5/0012 |
| 2010/0240294 A1 | 9/2010 | Goupil, Jr. | | |
| 2010/0284735 A1 | 11/2010 | Sievers et al. | | |
| 2013/0082056 A1 * | 4/2013 | Oertli | ............... | A61B 10/0096 |
| | | | | 220/257.1 |
| 2015/0144635 A1 * | 5/2015 | Shields | ............... | A47J 39/006 |
| | | | | 220/324 |
| 2016/0001629 A1 * | 1/2016 | Rohr | ............... | B60K 11/04 |
| | | | | 165/76 |

FOREIGN PATENT DOCUMENTS

| | | |
|---|---|---|
| JP | 2006123815 A | 5/2006 |
| JP | 2010023571 A | 2/2010 |

* cited by examiner

HVAC MODULE WITH HINGED CLAMP

TECHNICAL FIELD OF INVENTION

This disclosure generally relates to a heating, ventilation, and air-conditioning (HVAC) module for a vehicle, and more particularly relates to a hinged clamp that holds together parts that form a housing of the module.

BACKGROUND OF INVENTION

Heating, ventilation and air-conditioning (HVAC) modules for vehicles typically include a hollow housing. Heat exchangers, airflow creation devices, and/or airflow directing devices are typically disposed within the housing of the HVAC module. These components cooperate to receive, temper, and redirect a flow of forced air from an upstream blower assembly to and through a downstream outlet to be dispensed to the cabin of the vehicle. An exemplary HVAC module is disclosed in United States Patent Application Number 2010/0240294 published Sep. 23, 2010 by Goupil. Goupil shows a HVAC module with a housing partially formed of a flexible (i.e. pliable in response to a predetermined force) material that relies on a skeleton structure to attach the flexible portion of the housing to a rigid portion of the housing that supports other parts of the HVAC module such as a blower. There is a continuing need for HVAC modules that weigh less and are less expensive to manufacture.

SUMMARY OF THE INVENTION

In accordance with one embodiment, a heating, ventilation, and air-conditioning (HVAC) module for a vehicle is provided. The module includes a base, a cover, and a clamp. The base is configured to define a post protruding from a wall of the base. The cover is configured to define a hole that cooperates with the post to couple the cover to the base to form a housing of the module. The base is further configured to define the clamp which is coupled to the wall by a hinge. The clamp is operable between an open position where the hole can be placed around the post and a closed position where the clamp retains the hole around the post.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
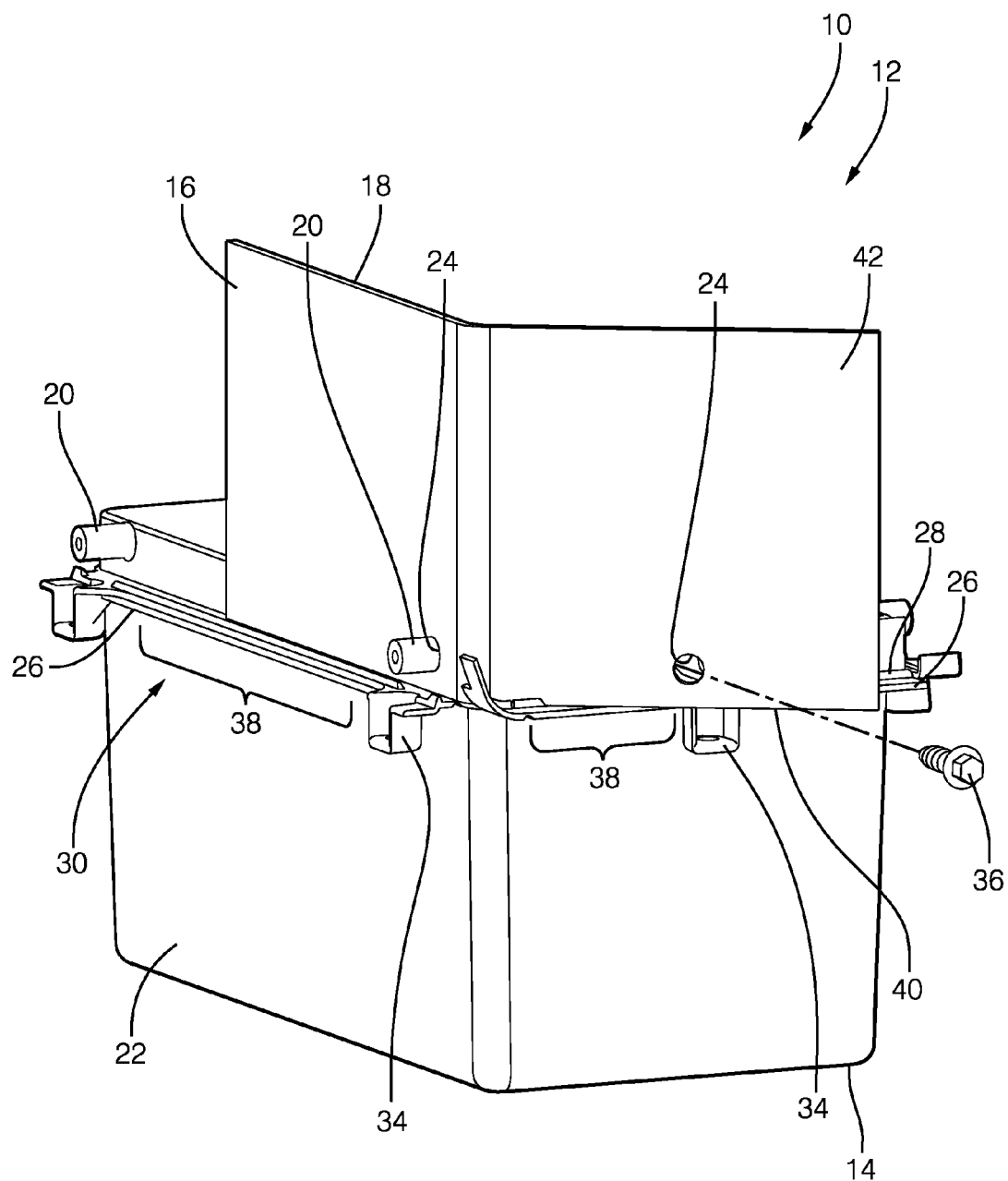
FIG. 1 is an isometric view of a HVAC module equipped with a clamp illustrated in an open position in accordance with one embodiment.
Figure 2:
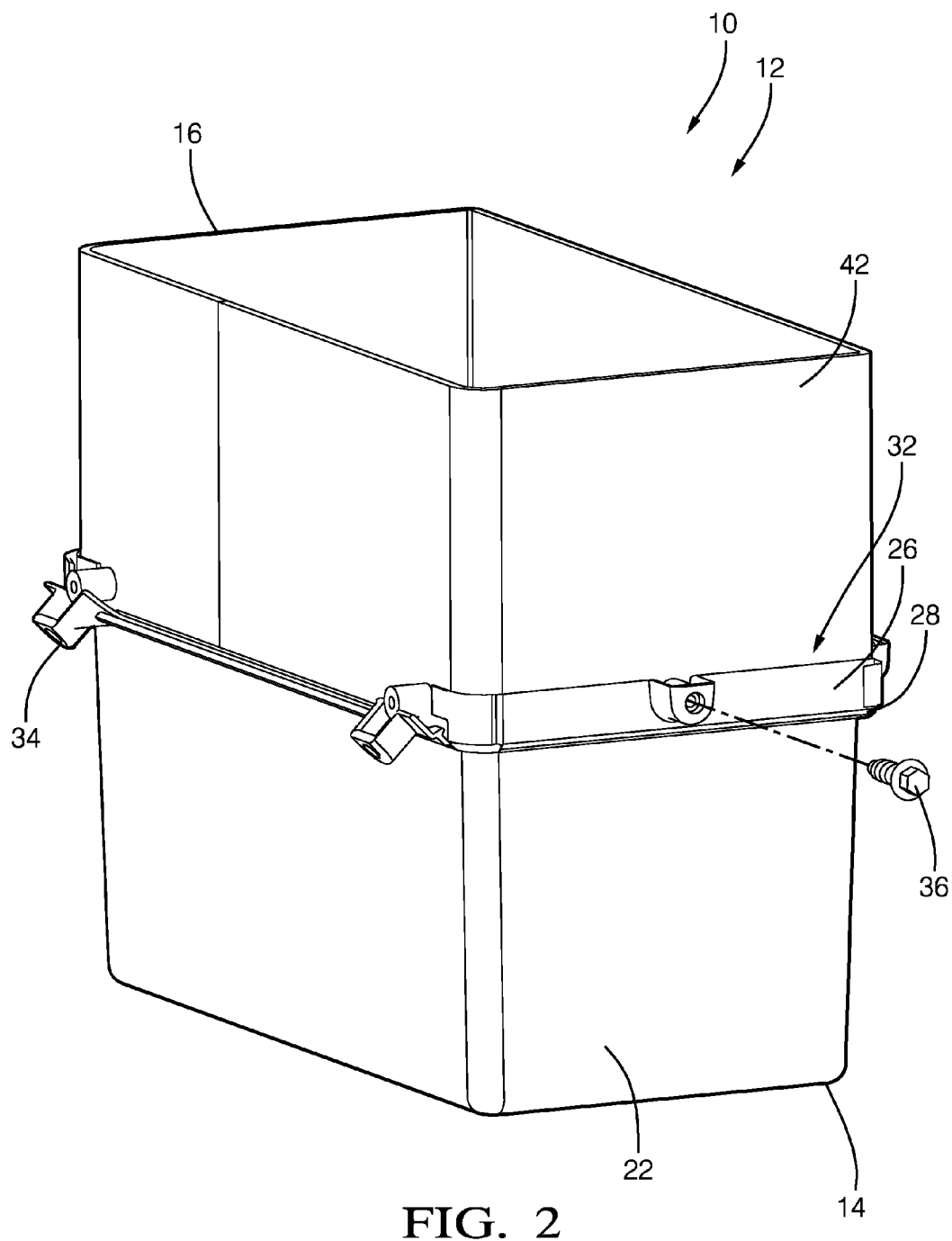
FIG. 2 is an isometric view of the HVAC module of FIG. 1 with the clamp illustrated in a closed position in accordance with one embodiment.
Figure 3:
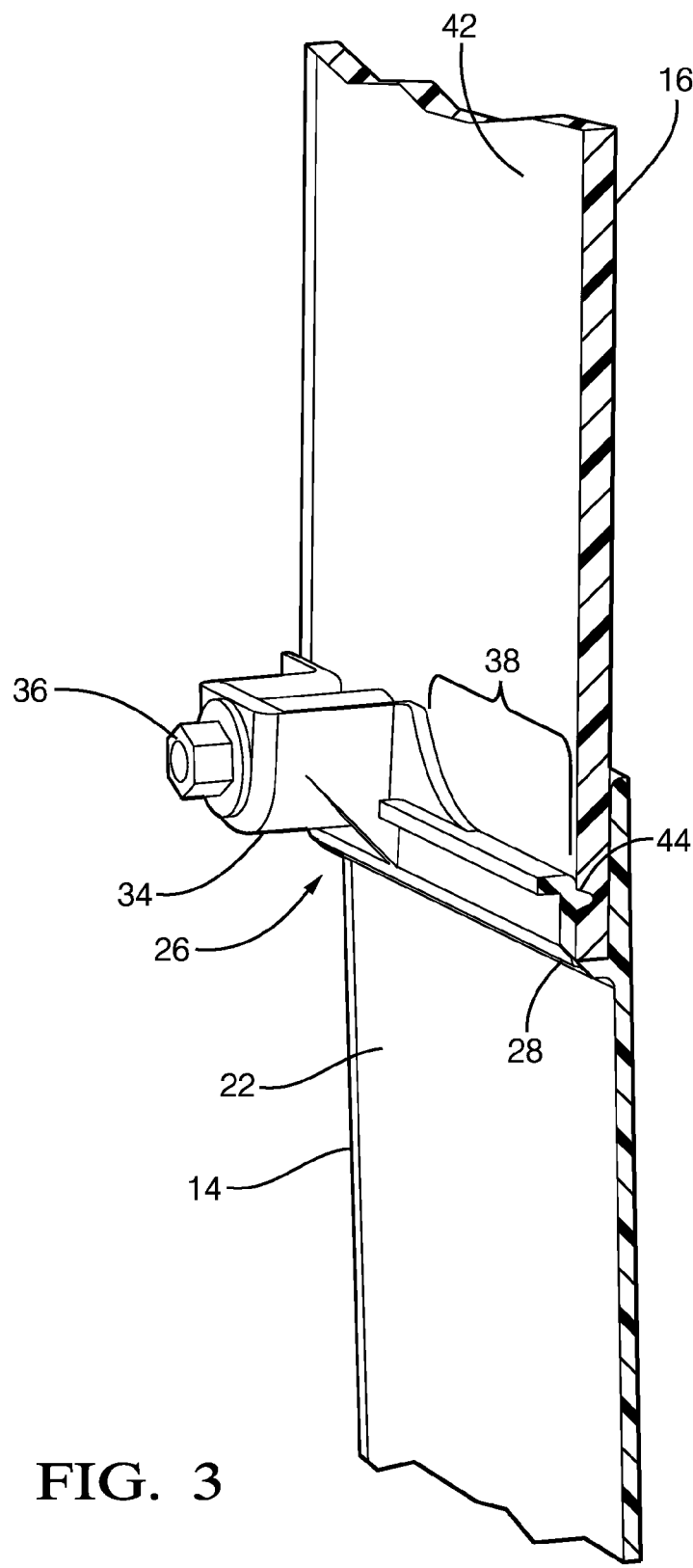
FIG. 3 is a close-up sectional view of the clamp of the HVAC module of FIG. 1 in accordance with one embodiment.

FIGS. 1-3 illustrate a non-limiting example of a heating, ventilation, and air-conditioning (HVAC) module, hereafter the module 10, suitable for use in a vehicle (not shown). U.S. Pat. No. 5,709,601 issued Jan. 20, 1998 to Heck and United States Published Patent Application 2010/0240294 published Sep. 23, 2010 by Goupil show examples of HVAC modules suitable for use in a vehicle, where the exemplary modules include a blower, valves, heat exchangers, and the like. These features are not illustrated in FIGS. 1-3 only for the purpose of simplifying the illustrations. As such, the absence of these features in FIGS. 1-3 does not limit the module 10 described herein to instances that do not include these features. As will be described in more detail below, the module 10 described herein includes an improved means for attaching together two halves or portions of a housing of the module 10.

The module 10, or the housing 12, includes a lower portion designated in this instance as a base 14. The base 14 is preferable formed of a relatively rigid material such as an injected molded plastic, a 20% talc-filled polypropylene for example. A rigid material is preferred so the base 14 can readily support, for example, a blower, one or more valves, one or more heat exchangers, and other components that, while not specifically shown, will be instantly recognized by those in the HVAC arts.

The housing 12 also includes an upper portion designated in this instance as a cover 16. Since the cover 16 in this instance is generally not intended to support relatively heavy parts like a blower, or provide much in the way of a means to attach the module 10 to the vehicle, the cover 16 may advantageously formed of a relatively light-weight and/or a relatively flexible (when compared to the material used for the base 14) material, a cross-linked polyethylene foam for example. The foam may be 'skinned' to provide a tougher surface finish, and to reduce air permeability if necessary.

The cover 16 may also be formed of a sheet of material that is, for example, die-cut and optionally creased so the cover 16 can be folded into a shape similar to an open box (i.e. a five sided box) when the cover 16 is mated to the base 14. That is, the cover 16 may be cut from sheet stock and remain in a flat state until the moment during manufacturing of the module 10 that the cover is wrapped/folded (as suggested in FIG. 2) into the desired shape and attached to the base 14. Those in the art will recognize that the cover 16 may include tabs or flaps (not shown) that can be used to hold the cover 16 in the desired shape, and seal a border 18 of the cover to another border to form a relatively air-tight cover assembly (e.g. the cover 16). Alternatively, the cover 16 may be open on top as illustrated in FIG. 2 so that, for example, another part or surface of the vehicle could be attached to the open end of the cover 16 using features similar to the clamp 26 to create a fully enclosed housing.

The module 10 described herein includes an improved way to couple or attach the cover 16 to the base 14. The base 14 is configured to define a post 20 protruding from a wall 22 of the base 14. While the post 20 is shown as protruding in an outward direction from the wall 22, configurations where one or more of instances of the post 20 are oriented in an inward direction (i.e. toward the center of the housing 12) are envisioned. The inward direction may be advantageous if an outward oriented post would interfere with some feature of the vehicle where the module 10 is to be installed. The outward direction is shown here as it is believed to be generally easier to assemble the module 10 when the post 20 is configured as shown, and the outward direction simplifies the mold used to fabricate the base 14 if injection molding is used.

In order to help secure the cover 16 to the base 14, the cover 16 is configured to define a hole 24 that cooperates with the post 20 to couple the cover 16 to the base 14 to form the housing 12 of the module 10. In order to further secure the cover 16 to the base 14, the base 14 is further configured to define a clamp 26 coupled to the wall 22 by a hinge 28. The hinge 28 allows for the clamp 26 to be operable (i.e. movable or rotatable) between an open position 30 where the hole 24 can be placed around the post 20, and a closed position 32 where the clamp 26 retains the hole 24 around the post 20.

In this non-limiting example, the material used to form the base 14 is formed thin enough to be flexible even though the wall 22 and other areas of the base 14 are characterized as relatively rigid because the material is thicker in those areas. Those in the molding arts will recognize or characterize this feature as a 'living hinge'. Alternatively, the hinge 28 may be a separate part used to couple the clamp 26 to the wall 22. However, the living hinge is preferable as the hinge 28 can be formed at the same time that the rest of the base 14 is formed, thereby saving on manufacturing costs.

The clamp 26 may include a shroud portion 34 configured to cover the post 20 when the clamp 26 is in the closed position 32. The shroud portion 34 may include or define a tab or snap feature (not shown) that engages with the post 20 to help keep the clamp 26 in the closed position 32 once moved there. Alternatively, the module 10 may include a fastener 36 that cooperates with the post 20 to retain the clamp 26 in the closed position 32. By way of example and not limitation, the fastener 36 may be a screw. A screw is advantageous over other semi-permanent fasteners such as rivets as the screw would allow for the module to be readily serviced as the cover 16 is not permanently attached to the base 14. That is, the screw and/or snap feature provide for a serviceable joint that can be disassembled and reassembled in the event an internal component of the module 10 needs service.

The clamp 26 described herein may also be configured to define or include an extended portion 38 that extends away and/or between the shroud portion 34. In general, the extended portion 38 is configured to retain an edge 40 of the cover 16 against the wall 22 of the base 14 when the clamp 26 is in the closed position 32. The extended portion 38 is particularly advantageous if the cover 16 is formed of a relatively flexible material that otherwise would not form an adequate seal against the wall without the extended portion 38. As such, for one embodiment, the cover 16 is formed of a sheet 42 of flexible material that cooperates with the clamp 26 to define part of the housing 12 when the clamp 26 is operated to the closed position 32 with the sheet suitably positioned relative to the clamp 26.

If the cover is formed of a compressible material, the extended portion 38 may be configured to define a ridge 44 that deforms the cover 16 to form a seal when the clamp 26 is operated to the closed position 32.

Accordingly, a heating, ventilation, and air-conditioning (HVAC) module (the module 10) for a vehicle is provided. The clamp 26 provides a means to join low-mass foam (the cover 16) to a rigid plastic case (the base 14). The base 14 is molded with a feature known as a 'living hinge' (the hinge 28). The clamp 26 is preferably located at the edges of the base 14 where it is used to attach or couple the cover 16 to the base 14. The clamp 26 is typically molded in the open position. To complete the attachment, the cover 16 is laid into the open hinge and the hinge is closed. The foam is then trapped between the two halves of the hinge (i.e. the clamp 26 and the wall 22). The clamp 26 may incorporate features to insure an air seal and/or a water seal. The clamp 26 may be secured in position using mechanical fasteners such as screws and/or snaps. Adhesives and/or welding or staking joining methods can also be used to secure clamp 26.

While this invention has been described in terms of the preferred embodiments thereof, it is not intended to be so limited, but rather only to the extent set forth in the claims that follow.

We claim:

1. A heating, ventilation, and air-conditioning (HVAC) module for a vehicle, said module comprising:
   a base forming a lower portion of a housing and configured for supporting at least a heat exchanger, the base including a post protruding from a wall of the base:
   a cover including a hole that cooperates with the post to couple the cover to the base to form the housing of the module,
   the base further including
   a clamp coupled to the wall by a hinge operable between an open position, where the clamp is coupled to the wall and disengaged from the post and where the hole can be placed around the post, and a closed position, where the clamp is releasably engaged with the post and retains the hole around the post.

2. The module in accordance with claim 1, wherein the hinge is a living-hinge.

3. The module in accordance with claim 1, wherein the clamp includes a shroud portion configured to cover the post when the clamp is in the closed position.

4. The module in accordance with claim 1, wherein the clamp includes an extended portion configured to retain an edge of the cover against the wall of the base when the clamp is in the closed position.

5. The module in accordance with claim 4, wherein the cover is formed of a sheet of material that flexible enough to cooperate with the clamp to define part of the housing when the clamp is operated to the closed position with the sheet suitably positioned.

6. The module in accordance with claim 4, wherein the cover is formed of a material compressible by the extended portion, and the extended portion defines a ridge that compresses the cover to form a seal when the clamp is operated to the closed position.

7. A heating, ventilation, and air-conditioning (HVAC) module for a vehicle, the module comprising:
   a base forming a lower portion of a housing and configured for supporting at least a heat exchanger, the base including a post protruding from a wall of the base:
   a cover configured to define a hole that cooperates with the post to couple the cover to the base to form a housing of the module, the base further configured to define
   a clamp coupled to the wall by a hinge, the clamp operable between an open position where the hole can be placed around the post and a closed position where the clamp retains the hole around the post,
   wherein the module includes a fastener that cooperates with the post to releasably retain the clamp in the closed position.

* * * * *